9068X
J. Bennock,
Rotary Steam Engine.
Patented Sep. 9, 1835.
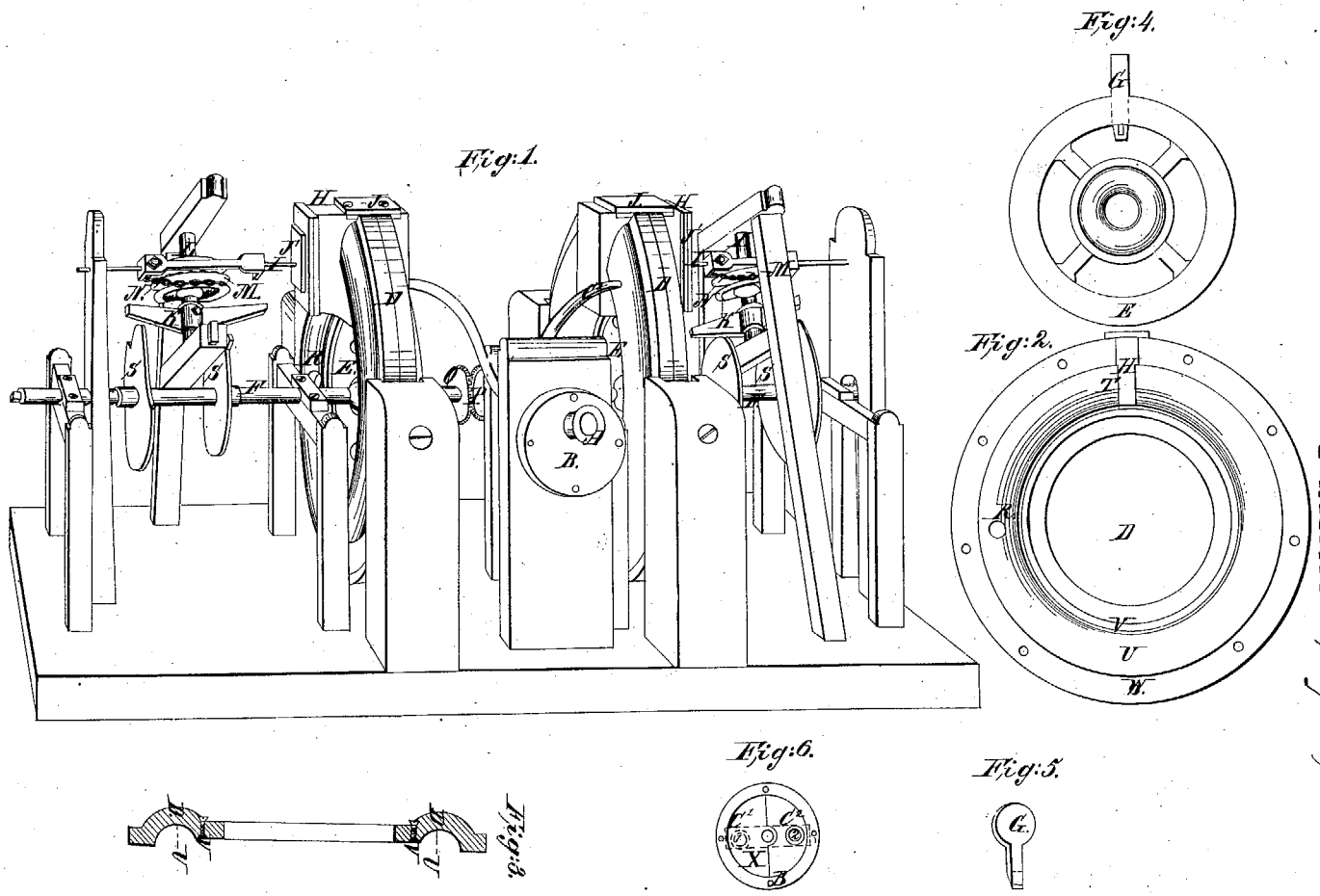
N. PETERS, PHOTO-LITHOGRAPHER, WASHINGTON, D. C.

John Bennock. Orono, Maine.

Letters Patent.

The Schedule, referred to in these Letters Patent and making part of the same, containing a description in the words of the John Bennock himself of his improvement in the Steam Engine.

To all to whom these presents shall come.

Be it known that I John Bennock, of Orono, in the County of Penobscot and State of Maine, have invented a new & useful improvement in the steam engine, and that the following is a full and exact description of the construction and operation of the said engine as invented or improved by me.
Fig 1. A. The steam pipe from the boiler to the steam box B. C¹ & C² steam pipes from the steam box B. to the circular cylinders D.D. which ~~which~~ are each made of two half circular pieces and are firmly bolted on the outer edge of the flange, so as to make a circular cylindrical cavity for the piston to move in. The inner flanges of the cylinders have so much turned off each as to permit the thickness of the rims of the wheels E E. between them when screwed (or bolted) together F. the axis on which the wheels E, E. are fixed and are made steam tight by rings of Brass or other metal let into a groove turned in the inside, (or side next the wheels) of the inner flange. The rings are pressed to the rim of the wheel as they wear, by screws passing through the flanges or any other kind of packing may be used. The piston G Fig 5. is made to fit the cylindrical cavity, and one is made fast to the rim of each of the wheels E E. by pieces projecting from the sides of the pistons and fitting into a hole in the rim of the wheels, and fastened with nuts or keys or in any other manner found most convenient. H H are boxes cast in flanges of the cylinders which when bolted together form a hole on the top to admit the pistons. also a hole on the side to admit valves which are attached to the

9068X the rods I L. which move them. these values are made to slide steam
tight across the cylinderical cavities which have grooves made
for the values to slide in. after the pistons are put into the rims
of the wheels the caps J.J. are screwed through its flanges to the
top of the box with a piece cast to the under side to fill up the hole
or parting in cylinder made to admit the piston all except room for
the valve to slide in. The rods I.L. work through holes in the caps
J.J. screwed to the sides of the boxes H.H. and work through packing
steam tight and the caps being also steam tight, render the whole when
the valves slide steam tight S.S.S.S. are executive wheels on the axis
F which move the arms K K on the shafts L.L. on which are also
the segments M.M which are connected with the rods I.I. by the
chains N.N.N.N. but this may be connected with rack or a variety
of other ways. The axis F may be made on one piece or of two pieces &
Joined in the middle by a coupling box as most convenient. on the
axis F. is a bevil wheel O which mashes into another bevel wheel
P. on the axis Q on which is a flat rotary valve turning steam
tight in the steam box B. and when revolving alternately shuts
and opens the steam pipes $C^1$. and $C^2$ and as the value is re-
duced from half of a circle so much longer will the steam pipes
be kept open, and the shorter time shut. It must be observed
that the pistons are on opposite sides of the wheels. now when
the piston in the cylinder in which is inserted the pipe $C^1$ has
passed the end of the pipe and the valve is shut by one of the arms
K. and at the same time by the revolving of the flat rotary valve,
the steam pipe $C^1$ is opened and the steam admitted between the
value in the cylinder and the piston, this forces the piston to move
from the value till it passes the hole in the cylinder at R when the
steam blows off and leaves the valves free from pressure – it
is then drawn back by the other arm K and gives the piston
liberty to pass. It will be perceived that just before the piston
comes to the place where the steam blows off the piston at
the other wheel has got past the valve in the cylinder and that
valve valve is shut and the steam pipe C² opened which makes the piston in the cylinder perform the same operation and carries the other to the place where it was at first. Fig 2 is a section of one half of the cylinder D. H the box to admit the the piston G and the valve T. U. one half of the circular cavity in which the piston revolves R the hole when the steam blows off to which may be attached a pipe to carry the waste steam where ever required V shows the brass or other metal ring which by pressing or fitting to the sides of the rim of the wheel E fig 4 renders it steam tight. W. the holes for the bolts to fasten the two half cylinders together. Fig 3. is a section of the cylinder D. at a right angle to fig 2. showing the semicircular cavity U with the brass ring V and the screws for pressing it forward Fig 4. the wheel E with the section of the piston G showing the manner in which it is keyed to the rim of the wheel Fig 5. a separate view of the piston G. Fig 6. the steam box B with the cover removed to show the revolving steam valve X and the ends of the steam pipes C¹ and C², also the end of the axis Q of the bevel wheel P. What I claim as my invention and not previously known in the above described Machine is. The using of two cylinders and the arrangement of the valves and pistons so as to produce a constant power, and also the rings of brass or other metal and the method of fitting them into the inner flanges of the cylinders, and and the manner of pressing them to the sides of the rims of the wheels so as to render the cylinders steam tight.

In testimony that the above is a full and exact description of the construction and operation of my machine as invented or improved by me I have hereunto set my hand this fifteenth day of August eighteen hundred and thirty-five ——

John Bennock

Witnesses
C. H. W. Wharton
Henry Stone (Drawing)

1240 [illegible]

E.A.
Coll